United States Patent Office 2,797,538
Patented July 2, 1957

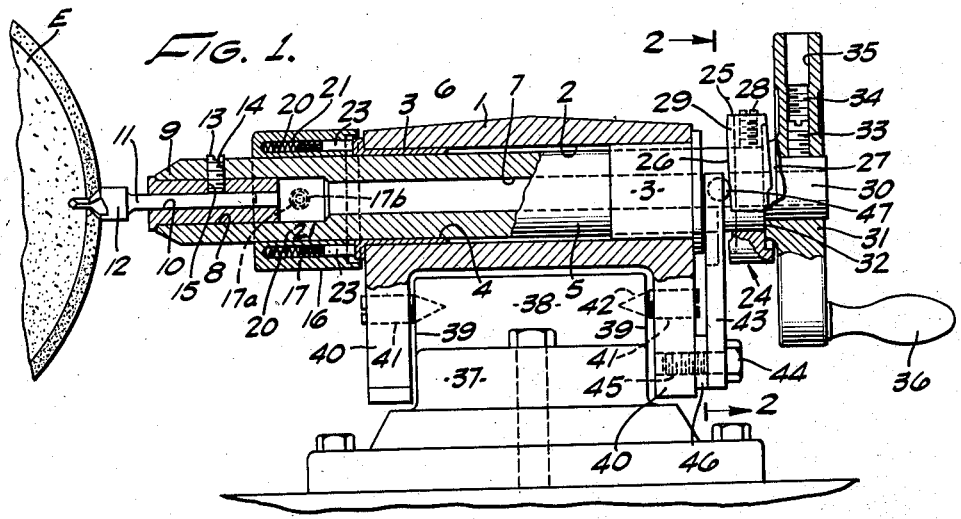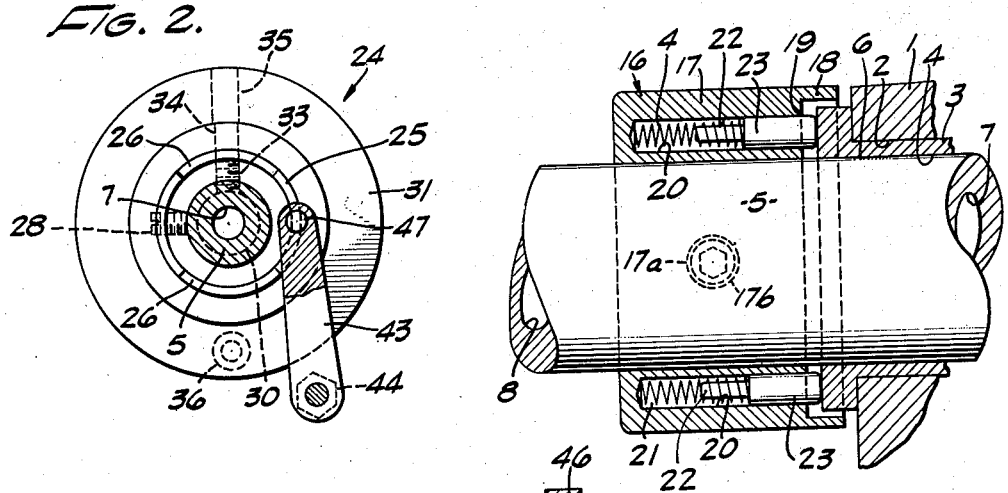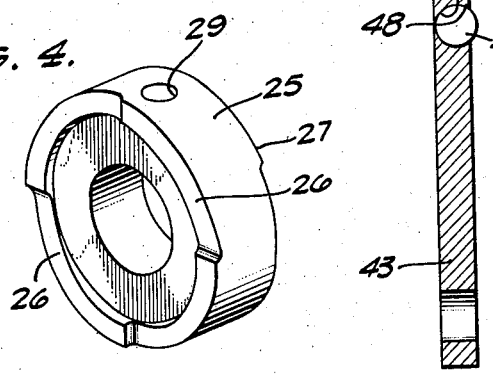

2,797,538

GRINDING DEVICE FOR TOOLS

Aurele A. Studler, Glendale, Calif.

Application October 30, 1953, Serial No. 389,203

1 Claim. (Cl. 51—219)

This invention relates to a device for holding and applying a tool that needs redressing, and a principal object of the invention is to provide a simple construction for mounting a spindle that carries the chuck so that the spindle when rotated will automatically shift the chuck to and fro adjacent the grinding wheel so as to enable the tool to touch the wheel and withdraw repeatedly.

I am aware that mountings have been employed for causing a carrying spindle to function in this way, but the devices referred to are relatively complicated, and involve the use of a considerable number of parts.

One of the objects of this invention is to provide relatively simple means requiring few parts for effecting this shifting of the chuck in the grinding operation; also to provide means at one end of the pillow block for effecting the return movement of the chuck, and at its other end to provide interchangeable means that can be readily mounted on the spindle to determine the number of reciprocations that the spindle will have. This increases the range of usefulness of the device for effecting the grinding of tools of different character that are used for performing different specific functions in various industries.

Further objects of the invention will appear from a careful study of the specification, and a study of the accompanying drawing.

The invention consists in the novel parts and combinations of parts to be described hereinafter, all of which contribute to produce an efficient grinding device for tools.

A preferred embodiment of the invention is described in the following specification, while the broad scope of the invention is pointed out in the appended claim.

In the drawing:

Figure 1 is a partial section and side elevation of this holding device in which the parts in section are illustrated in section on a vertical plane passing through the longitudinal axis of the spindle and chuck.

Figure 2 is a cross-section taken in a transverse vertical plane passing substantially through the line 2—2 of Figure 1, and particularly illustrating one of the actuating faces of the collar that functions as a cam to effect the shifting of the spindle in one direction. In the present instance that direction is toward the grinding wheel.

Figure 3 is a detail upon an enlarged scale illustrating the means that I prefer to employ at the other end of the pillow-block to effect the return movement of the spindle and chuck carried thereby. In this view a portion of the spindle is shown broken away.

Figure 4 is a perspective of an interchangeable collar which is preferably provided with different actuating cams on its two faces.

Figure 5 is a longitudinal section through an arm that I prefer to employ for carrying anti-friction means that cooperates with the cam to shift the spindle to withdraw the chuck, and tool being ground, from contact with the grinding wheel.

Referring more particularly to the parts, and particularly to Figure 1, in practicing the invention I provide a spindle housing or pillow-block of any suitable construction. As illustrated, it has a substantially tubular body 1 having a bore 2 extending through the same. At the ends of this bore two bushings 3 are provided, the bores 4 of which rotatably support the spindle 5 of the holder.

The spindle 5 is of relatively large diameter to give it greater wearing surface to its journals 6 in the bushings but its weight is greatly reduced by reason of the presence of a bore 7 of considerable size that extends into it from its rear end.

At the forward end a counterbore 8 of slightly larger diameter extends in, and constitutes a chuck-chamber to receive a chuck 9 in the form of bushing or collet having a bore 10 to receive the cylindrical shank 11 of a tool 12 such as the counter-sinking drill illustrated.

The chuck 9 and the tool also may both be secured in the counterbore 8 by a set screw 13 threaded in a tapped hole 14. The tip of this set-screw 13 fits neatly into a hole 15 drilled through the wall of the chuck so as to permit the end of the set-screw to be tightened up against the side of the shank 11. In this way the set-screw is made to perform two functions, holding the tool in place and also the chuck 9. By turning the set-screw through a few degrees the shank 11 of the tool can be released which will withdraw the end of the screw into the opening 15 in the chuck. The opening 15 should not be threaded.

In the present instance the spindle and chuck are shifted toward the grinder element, such as an abrasive wheel (the edge E of which is shown in Figure 1), by a shifting-means 16 mounted on the spindle at the end of the bearing or upper portion of the pillow-block that is adjacent to the tool.

In order to effect the return of the spindle toward the grinder, I prefer to provide a collar 17 (see Figures 1 and 3) which preferably has an over-size counterbore 18 the inner end of which may overlap the flange of the adjacent bushing 3; and the inner face 19 of this collar is provided with a plurality of drilled spring chambers 20 in which a plurality of coiled springs 21 are placed, respectively. These springs are held centered in their bores by pintles 22 that are integral with their heads 23 at their other ends, and which are thrust by their springs 21 against the adjacent end face of the bushing 3. The number of these drilled spring chambers and the strength of the springs 21 would be determined by the type and size of the tools that are to be ground on the wheel at 15.

The collar 17 is secured to the arbor or spindle 5 by a set-screw 17a in a radial threaded opening 17b in the collar (see Figure 1).

At the other end of the pillow-block, means 24 is provided for withdrawing the spindle and tool carried thereby from contact with the grinding wheel. For this purpose I prefer to employ interchangeable cam collars such as the cam-collar 25. Each collar is preferably double faced, that is to say, each collar has a number of cam faces 26 on one of its ends, and a different number of cam faces 27 on its other end; for example, I may have 3 cam faces 27 on the outer end of the cam collar 24, and four of the cam faces 26 on the other end. And in practice a number of such cam-collars would be provided with each tool-holder apparatus, all of which would be interchangeable so that any one of them could be mounted at will on the spindle or arbor 5. Each of these collars is provided with a set-screw such as the set-screw 28 mounted in a radial tapped socket 29 and the inner end of the set-screw to be tightened up against the periphery of the spindle 5.

The extreme end of the spindle 5 is turned down to form a pintle 30 to carry means for rotating the spindle. This may be a crank in the form of a hand wheel 31 when slipped over it, and the inner end of this handle seats against the shoulder 32 at the root of the pintle. This hand-wheel is also secured in place by a set-screw 33 which is mounted in the threaded inner end 34 of a drilled hole 35 extending in from the periphery or the disc of the hand-wheel, and it can be tightened up or loosened by a small screw driver inserted through the bore at the periphery of the hand-wheel.

The hand-wheel is provided with a suitable handle 36 to enable the spindle to be rotated at any speed desired, depending upon the character of the tool and the technique of the grinding operation.

The pillow-block includes a base portion 37 including a block form abutment 38 the end faces 39 of which present themselves adjacent to the inner faces of two wings or segments 40 that are integral with the spindle housing 1 and extend down from the same. These segments are used in some grinders of this type, and the mounting for the spindle housing includes two large diameter set screws 41 with conical tips 42 that are received in conical sockets drilled into the faces 39.

It should be said at this point that in this type of tool-holder it is the usual practice to bias the spindle housing to rotate in one direction about the axes of the large screws 41, and to provide the spindle housing with a lever for rotating the housing in a direction to oppose the direction in which the housing is biased. This mounting enables the head of the tool 12 to be moved laterally to bring it into the plane of the grinder wheel. However, as that feature of this type of tool tolder forms no part of this invention it is not illustrated in the drawing.

In order to provide a relatively fixed anti-friction thrust point for engaging with the cam face such as the cam face 26 as shown in Figure 1, I provide a cam follower preferably including an arm 43 the lower end of which has a clamping bolt with a nut head 44 to clamp against the outer face of the arm 43; and the shank of this bolt is mounted in a threaded opening 45 on the face of the adjacent wing 40.

Between the inner face of the arm 43 and the adjacent face of the wing 40 a washer 46a is provided of predetermined thickness. The upper end of the arm 43 lies in the space between the flange of the adjacent bushing 3 and the cam-collar 25 (see Figure 5). And on its face toward the cam-collar 25 the arm 43 has a hemi-spherical socket 46 carrying a hard-steel ball 47 on which the cam faces 26 or 27 roll when the arbor 5 is being rotated by the handle 36.

After the ball 47 has been placed in its socket 46 the edge of the socket is treated to a peening operation that develops an inwardly projecting lip 48 that retains the ball.

In the operation of this tool-holder when the spindle is rotating continuously in one direction, as the cam-faces 26 or 27 ride up on the ball 47 the cam-collar 25 pulls the arbor 5 toward the right, thereby compressing the springs 21. And when a dip in the cam-face is passing the ball, the springs extend themselves to force the tool 12 toward, and against the beveled face of the edge 15 of the grinder element.

Whenever it is necessary to use a new or different cam at the location of the cam-collar 25 the arm 43 can be adjusted by loosening its clamping bolt head 44 to enable the free end of the arm to be secured in the proper position with relation to the axis of the spindle 5 that will enable the point of contact of the ball 47 with the faces of the new cam, to be adjusted properly to its cam faces. In this operation it is most advantageous that the ball 47 has a single point of contact with the cam face of the substituted cam-collar. In this respect it is far superior to a roller, the axis of rotation of which would change with every change in position of the arm 43. In other words, the use of this arm and ball-type "roller" enables the position of the spindle point of contact of the ball to be immediately adjusted to any new cam that may be substituted for the one on the machine.

In the operation of this grinder it is also advantageous that the piece being ground is pressed by spring pressure against the abrasive face of the grinder because this insures that such pressure will always be uniform. On this account little or no skill is involved in a grinding operation, and the piece being ground is applied mechanically with the same force each time it contacts the grinder.

Many other embodiments of this invention may be resorted to without departing from the spirit of this invention.

I claim as my invention and desire to secure by Letters Patent:

In a grinding machine, the combination of a rotary grinder presenting a moving abrasive face, a fixed casing located near the rotary grinder and having a bore to receive a spindle, a spindle the axis whereof extends forwardly towards said abrasive face, a bushing at the rear end of the casing's bore for guiding the said spindle, a chuck at the forward end of the spindle for carrying the work-piece to be ground, said spindle having a projecting rear end extending beyond the said bushing, a cam carried by the said projecting rear end of the spindle, having a cam face on its forward side toward the rear bushing, a cam-follower for the cam in the form of an arm with a ball-socket on its face toward the cam, a ball rotatably held in the socket and running on the cam, clamping means on the casing for pivotally supporting, adjusting and securing the cam follower arm in different angular positions to enable it to lie between the cam and the rear bushing and also enable the ball to ride on cams of different diameters; means mounted on the said projecting rear end of the spindle for manually rotating the spindle and the cam to shift the spindle rearwardly and withdraw the work-piece carried by the chuck from contact with the grinder face, said spindle having a projecting forward end and with a collar secured on the same, with means for thrusting resiliently against the forward end of the casing and against the collar to shift the spindle forward and apply the work-piece to the abrasive face of the grinder as permitted by the rotation of the cam face.

References Cited in the file of this patent

UNITED STATES PATENTS

| | | |
|---|---|---|
| 1,759,842 | Fossa | May 27, 1930 |
| 2,035,163 | Holmberg | Mar. 24, 1936 |
| 2,099,724 | Cogsdill | Nov. 23, 1937 |
| 2,212,223 | Barnes | Aug. 20, 1940 |
| 2,217,091 | Zwick | Oct. 8, 1940 |
| 2,325,364 | Boening | July 27, 1943 |
| 2,436,535 | Walther | Feb. 24, 1948 |
| 2,442,318 | Weisel | May 25, 1948 |
| 2,482,802 | Sanders | Sept. 27, 1949 |
| 2,538,651 | Parker | Jan. 16, 1951 |
| 2,720,731 | Staat | Oct. 18, 1955 |

FOREIGN PATENTS

| | | |
|---|---|---|
| 26,452 | Great Britain | Nov. 25, 1911 |
| 248,276 | Switzerland | Feb. 2, 1948 |